(12) United States Patent
Mullins

(10) Patent No.: US 10,089,791 B2
(45) Date of Patent: Oct. 2, 2018

(54) PREDICTIVE AUGMENTED REALITY ASSISTANCE SYSTEM

(71) Applicant: DAQRI, LLC, Los Angeles, CA (US)

(72) Inventor: Brian Mullins, Altadena, CA (US)

(73) Assignee: DAQRI, LLC, Los Angeles, CA (US)

( * ) Notice: Subject to any disclaimer, the term of this patent is extended or adjusted under 35 U.S.C. 154(b) by 0 days.

(21) Appl. No.: 15/393,256

(22) Filed: Dec. 29, 2016

(65) Prior Publication Data

US 2018/0190020 A1 Jul. 5, 2018

(51) Int. Cl.
*G09G 5/00* (2006.01)
*G06T 19/00* (2011.01)
*G06T 19/20* (2011.01)
*G06N 7/00* (2006.01)

(52) U.S. Cl.
CPC .......... *G06T 19/006* (2013.01); *G06N 7/005* (2013.01); *G06T 19/20* (2013.01)

(58) Field of Classification Search
None
See application file for complete search history.

(56) References Cited

U.S. PATENT DOCUMENTS

| 8,743,145 | B1 * | 6/2014 | Price | G06T 19/006 345/629 |
| 9,030,498 | B2 * | 5/2015 | Galor | G06F 3/017 345/158 |
| 2013/0044128 | A1 * | 2/2013 | Liu | G09G 5/00 345/633 |

* cited by examiner

*Primary Examiner* — Jason Pringle-Parker
(74) *Attorney, Agent, or Firm* — Schwegman Lundberg & Woessner, P.A.

(57) ABSTRACT

A predictive augmented reality assistance system is described. A device generates and renders augmented reality content in a display of the device. The device tracks user interactions with the augmented reality content of a user of the device. A context of the user interactions with the augmented reality content is determined based on the user interactions. A behavioral analysis of a user of the device is generated based on the context of the user interaction. A predictive model of the user of the device is generated based on the behavioral analysis. The augmented reality content is modified based on the predictive model of the user of the device.

16 Claims, 9 Drawing Sheets

PREDICTIVE AUGMENTED REALITY ASSISTANCE SYSTEM

TECHNICAL FIELD

The subject matter disclosed herein generally relates to the processing of data. Specifically, the present disclosure addresses systems and methods for customizing augmented reality content to assist a user of an augmented reality device.

BACKGROUND

A device can be used to generate and display data in addition to an image captured with the device. For example, augmented reality (AR) is a live, direct or indirect view of a physical, real-world environment whose elements are augmented by computer-generated sensory input such as sound, video, graphics or Global Positioning System (GPS) data. With the help of advanced AR technology (e.g., adding computer vision and object recognition) the information about the surrounding real world of the user becomes interactive. Device-generated (e.g., artificial) information about the environment and its objects can be overlaid on the real world.

On the one hand, information displayed in a display of the AR device can be overwhelming for a new user of the AR device. On the other hand, a power user would likely desire to have the AR device display more features and information in the display of the AR device.

BRIEF DESCRIPTION OF THE DRAWINGS

Some embodiments are illustrated by way of example and not limitation in the figures of the accompanying drawings.

DETAILED DESCRIPTION

Figure 1:
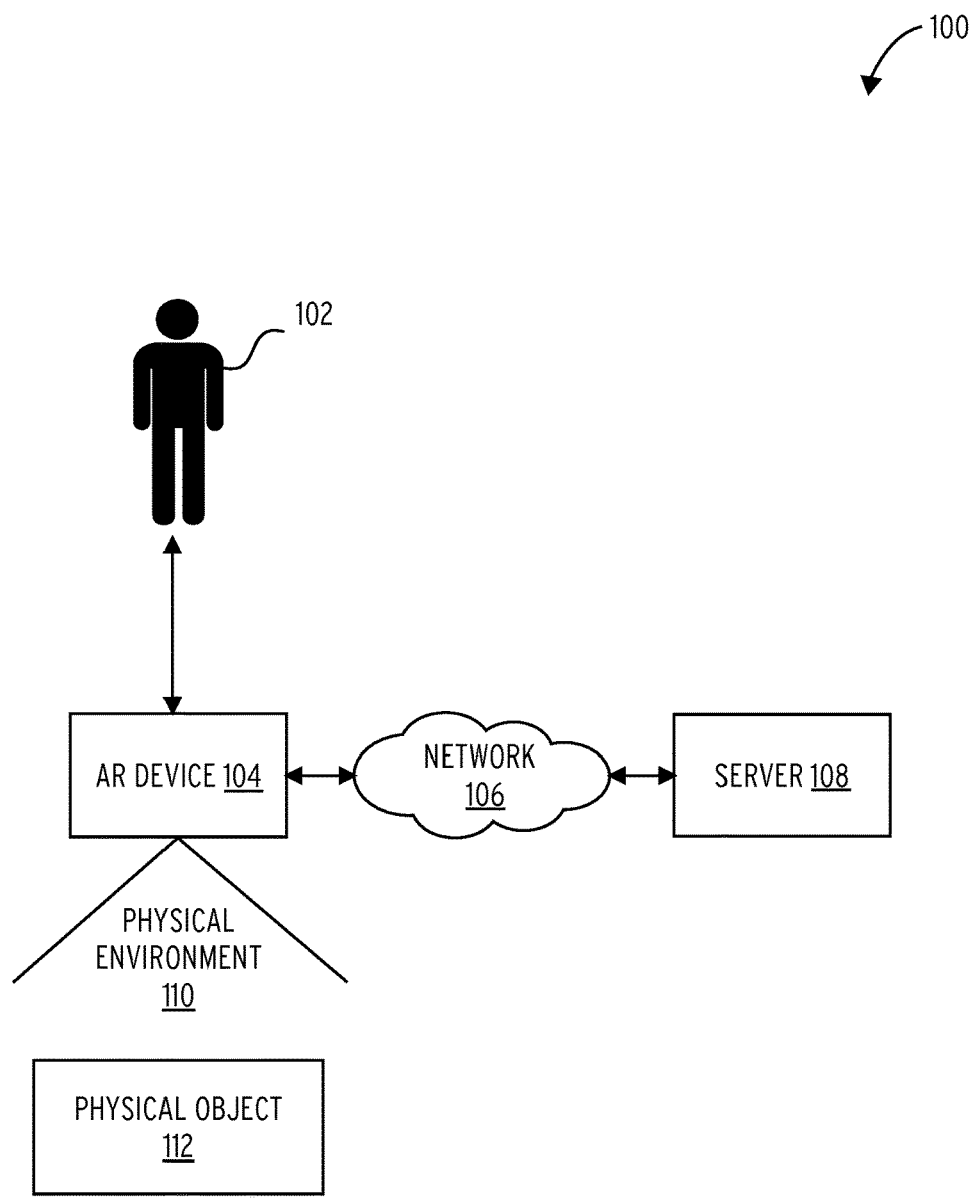
FIG. 1 is a block diagram illustrating an example of a network suitable for a predictive AR assistance system, according to some example embodiments.

Example methods and systems are directed to a predictive AR assistance module for an augmented reality application. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

AR applications allow a user to experience information, such as in the form of a three-dimensional virtual object overlaid on an image of a physical object captured by a camera of a viewing device. The physical object may include a visual reference that the augmented reality application can identify. A visualization of the additional information, such as the three-dimensional virtual object overlaid or engaged with an image of the physical object, is generated in a display of the device. The three-dimensional virtual object may be selected based on the recognized visual reference or captured image of the physical object. A rendering of the visualization of the three-dimensional virtual object may be based on a position of the display relative to the visual reference. Other augmented reality applications allow a user to experience visualization of the additional information overlaid on top of a view or an image of any object in the real physical world. The virtual object may include a three-dimensional virtual object or a two-dimensional virtual object. For example, the three-dimensional virtual object may include a three-dimensional view of a chair or an animated dinosaur. The two-dimensional virtual object may include a two-dimensional view of a dialog box, menu, or written information such as statistics information for a baseball player. An image of the virtual object may be rendered at the viewing device.

Unfortunately, AR device users can easily become overwhelmed with the large amount of information and available selections displayed in an interactive AR environment. To present users of AR devices from being overloaded with choices and information in the AR environment, the present application describes a predictive AR assistance system that preprocesses information relevant to the user and the AR device and generates suggestions for the user based on predictive models from user behavior analysis. For example, data from the AR device, multi-sensory platforms, and connected databases in the AR environment can be used to perform a behavior analysis and predict and display custom/relevant AR content (e.g., action items, virtual objects, user interfaces) to the user.

In one example embodiment, the present disclosure describes an AR assistance system that is based on deep learning and predictive models to help the user in the following example scenarios:

Filter information: the predictive AR assistance system blocks spam and redundant info from displaying in the AR device, highlights and pushes important items (audio/visual means) to the user.

Analyze user behavior and make suggestions accordingly: the present AR assistance system can schedule reminders, provide keywords search and feeds, and generate intelligent guesses based on the predictive model.

Self-learning: the present AR assistance system can adapt predictions and assists to the user, based on his/her working habit, interests, routines and methods, biological and behavioral signatures.

In one example embodiment, a predictive augmented reality (AR) assistance system includes a device that generates and renders an augmented reality (AR) content in a display of the device. The device tracks user interactions with the AR content of a user of the device. A context of the user interactions with the AR content is determined based on the user interactions. A behavioral analysis of a user of the device is generated based on the context of the user interaction. A predictive model of the user of the device is generated based on the behavioral analysis. The AR content is modified based on the predictive model of the user of the device.

In another example embodiment, a non-transitory machine-readable storage device may store a set of instructions that, when executed by at least one processor, causes the at least one processor to perform the method operations discussed within the present disclosure.

FIG. 1 is a network diagram illustrating a network environment 100 suitable for operating a predictive AR assistance module of an AR device, according to some example embodiments. The network environment 100 includes an AR device 104 and a server 108, communicatively coupled to each other via a network 106. The AR device 104 and the server 108 may each be implemented in a computer system, in whole or in part, as described below with respect to FIG. 9.

The server 108 may be part of a network-based system. For example, the network-based system may be or include a cloud-based server system that provides AR content (e.g., augmented information including 3D models of virtual objects related to physical objects in images captured by the AR device 104) to the AR device 104.

The AR device 104 includes a head mounted device that a user 102 may wear to view the AR content related to captured images of physical objects (e.g., physical object 112) in a real world physical environment 110. In one example embodiment, the AR device 104 includes a computing device with a camera and a display (e.g., smart glasses, smart helmet, smart visor, smart face shield, smart contact lenses). The computing device may be removably mounted to the head of the user 102. In one example, the display may be a screen that displays what is captured with a camera of the AR device 104. In another example, the display of the HMD 101 may be a transparent display, such as in the visor or face shield of a helmet, or a display lens distinct from the visor or face shield of the helmet.

The user 102 may be a user of an AR application in the AR device 104 and at the server 108. The user 102 may be a human user (e.g., a human being), a machine user (e.g., a computer configured by a software program to interact with the AR device 104), or any suitable combination thereof (e.g., a human assisted by a machine or a machine supervised by a human). The user 102 is not part of the network environment 100, but is associated with the AR device 104.

In one example embodiment, the AR application determines the AR content to be rendered and displayed in the lens of the AR device 104 based on sensor data related to the user 102, sensor data related to the AR device 104, user interactions between the user 102 and the AR application, and context data related to the AR application. Examples of sensor data related to the user 102 may include measurements of a heart rate, a blood pressure, brain activity, and biometric data related to the user 102. Examples of sensor data related to the AR device 104 may include a geographic location of the AR device 104, an orientation and position of the AR device 104, an ambient pressure, an ambient humidity level, an ambient light level, and an ambient noise level detected by sensors in the AR device 104. Examples of user interactions includes how often (a frequency) a user have used certain features of the AR content or the AR application. Examples of context data may include a task performed by the user 102 or an identification of task instructions provided by the AR application.

In one embodiment, the AR application may provide the user 102 with an AR experience triggered by identified objects in the physical environment 110. The physical environment 110 may include identifiable objects such as a 2D physical object (e.g., a picture), a 3D physical object (e.g., a factory machine), a location (e.g., at the bottom floor of a factory), or any references (e.g., perceived corners of walls or furniture) in the real world physical environment 110. The AR application may include computer vision recognition to determine corners, objects, lines, and letters. The user 102 may point a camera of the AR device 104 to capture an image of the physical object 112.

In one example embodiment, the physical object 112 in the image is tracked and recognized locally in the AR device 104 using a local context recognition dataset or any other previously stored dataset of the AR application of the AR device 104. The local context recognition dataset module may include a library of virtual objects associated with real-world physical object 112 or references. In one example, the AR device 104 identifies feature points in an image of the physical object 112 to determine different planes (e.g., edges, corners, surface, dial, and letters). The AR device 104 may also identify tracking data related to the physical object 112 (e.g., GPS location of the AR device 104, orientation, distance to physical object 112). If the captured image is not recognized locally at the AR device 104, the AR device 104 can download additional information (e.g., 3D model or virtual characters or other augmented data) corresponding to the captured image, from a database of the server 108 over the network 106.

In another example embodiment, the physical object 112 in the image is tracked and recognized remotely at the server 108 using a remote context recognition dataset or any other previously stored dataset of an AR application in the server 108. The remote context recognition dataset module may include a library of virtual objects (e.g., customized virtual content) or augmented information associated with real-world the physical object 112, or references.

In one example embodiment, the AR device 104 may use internal or external sensors to track the location and orientation of the AR device 104 relative to the physical object 112. For example, data from the sensors may be used for analytics data processing at the AR device 104 or at the server 108 for analysis on usage and how the user 102 is interacting with the physical object 112. For example, the analytics data may track at what locations (e.g., points or features) on the physical or virtual object the user 102 has looked, how long the user 102 has looked at each location on the physical or virtual object, how the user 102 held the AR device 104 when looking at the physical or virtual object, which features of the virtual object the user 102 interacted with (e.g., such as whether the user 102 tapped on a link in the virtual object), and any suitable combination thereof. The AR device 104 receives a visualization content dataset related to the analytics data. The AR device 104 then generates a virtual object with additional or visualization features, or a new experience, based on the visualization content dataset.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIGS. 7, 8. As used herein, a "database" is a data storage resource and may store data structured as a text file, a table, a spreadsheet, a relational database (e.g., an object-relational database), a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 106 may be any network that enables communication between or among machines (e.g., server 108), databases, and devices (e.g., AR device 104). Accordingly, the network 106 may be a wired network, a wireless network (e.g., a mobile or cellular network), or any suitable combination thereof. The network 106 may include one or more portions that constitute a private network, a public network (e.g., the Internet), or any suitable combination thereof.

Figure 2:
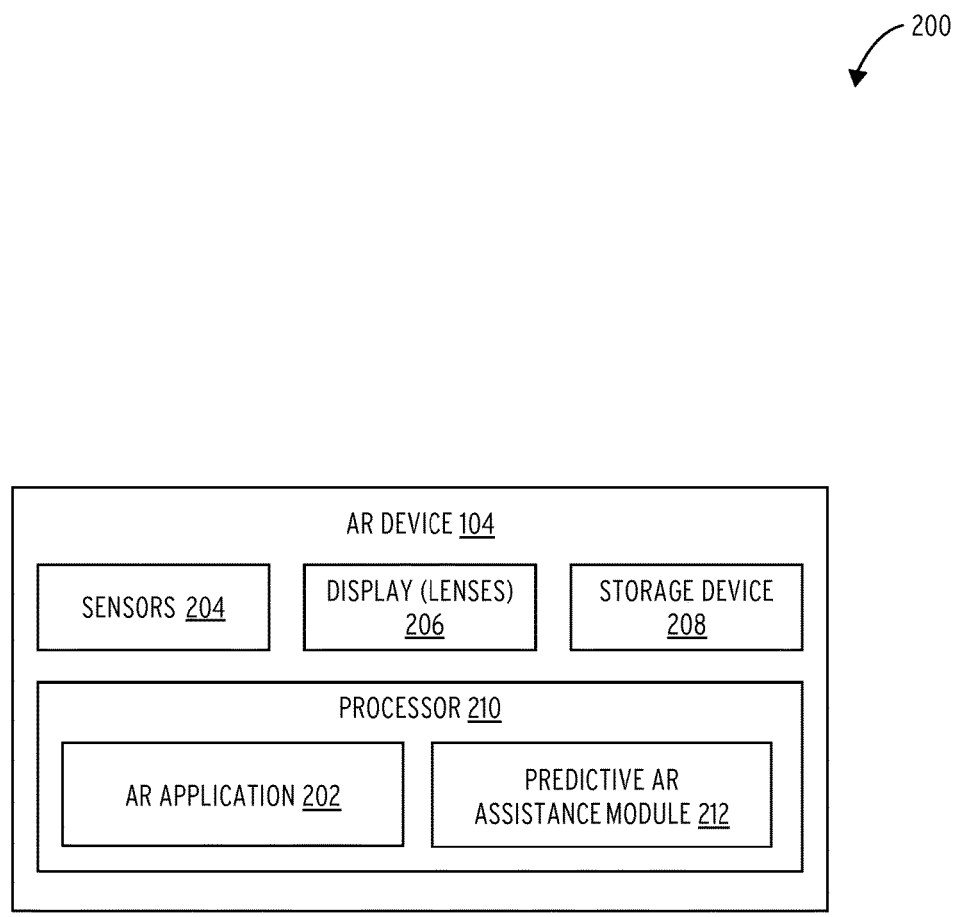
FIG. 2 is a block diagram illustrating an example embodiment of modules (e.g., components) of an AR device.

FIG. 2 is a block diagram illustrating modules (e.g., components) of the AR device 104, according to some example embodiments. The AR device 104 may be a head mounted device that includes sensors 204, a display 206, a storage device 208, and a processor 210. The AR device 104 may include other types of wearable devices.

The sensors 204 measure and generate internal tracking data of the AR device 104 to determine a geographic location, a position, and an orientation of the AR device 104. The geographic location may be determined by using, for example, a GPS device. The position and the orientation of the AR device 104 may be used to determine a field of view of the user 102. For example, the direction in which the user 102 is looking may be determined based on the position and orientation of the AR device 104 worn by the user 102. Therefore, the sensors 204 may be used to determine whether the AR device 104 is oriented towards a real world object (e.g., when the user 102 looks at physical object 112) or in a particular direction (e.g., when the user 102 tilts his head to watch his wrist). Furthermore, sensors 204 may be used to identify real world objects in a field of view of the AR device 104. For example, a virtual object may be rendered and displayed in the display 206 when the sensors 204 indicate that the AR device 104 is oriented towards at the physical object 112. The virtual object may be based on a combination sensor data from the sensors 204.

Figure 3:
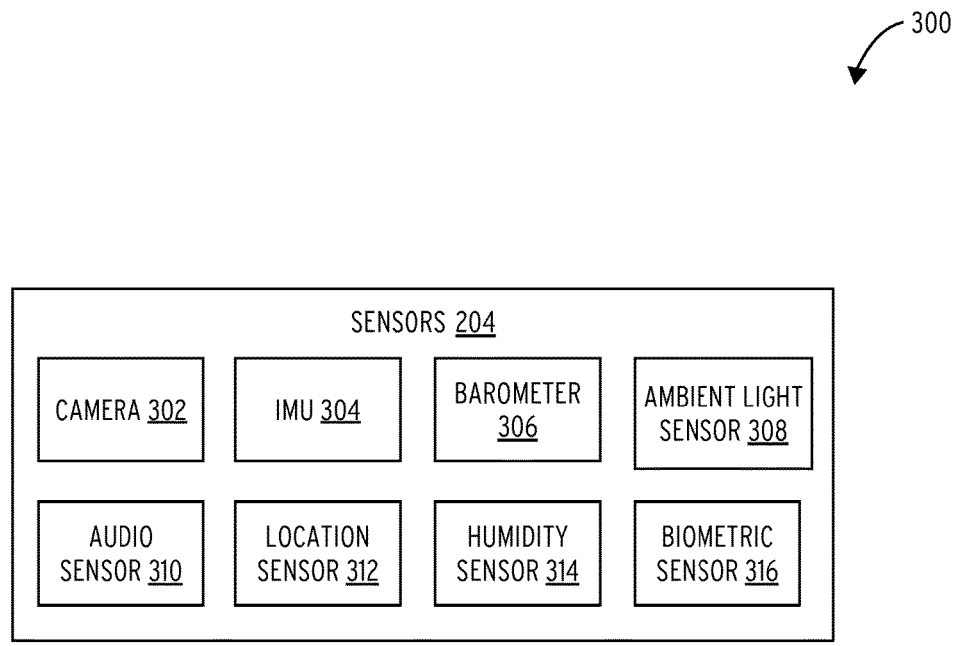
FIG. 3 is a block diagram illustrating an example embodiment of sensors in an AR device.

FIG. 3 is a block diagram illustrating examples of sensors. For example, the sensors 204 include a camera 302, an audio sensor 310, an IMU (e.g., inertial measurement unit) sensor 304, a location sensor 312, a barometer 306, a humidity sensor 314, an ambient light sensor 308, and a biometric sensor 316. It is noted that the sensors 204 described herein are for illustration purposes. Sensors 204 are thus not limited to the ones described.

The camera 302 includes an optical sensor(s) (e.g., camera) that may encompass different spectra. The camera 302 may include one or more external cameras aimed outside the AR device 104. For example, the external camera may include an infrared camera or a full spectrum camera. The external camera may include rear facing camera and front facing camera disposed in the AR device 104. The front facing camera may be used to capture a front field of view of the AR device 104 while the rear facing camera may be used to capture a rear field of view of the AR device 104. The pictures captured with the front and rear facing cameras may be combined to recreate a 360 degree view of the physical world around the AR device 104.

The camera 302 may include one or more internal cameras aimed at the user 102. The internal camera may include an infrared (IR) camera configured to capture an image of a retina of the user 102. The IR camera may be used to perform a retinal scan to map unique patterns of the retina of the user 102.

Blood vessels within the retina absorb light more readily than the surrounding tissue in the retina and therefore can be identified with IR lighting. The IR camera may cast a beam of IR light into the user's eye as the user 102 looks through the display 206 (e.g., lenses) towards virtual objects rendered in the display 206. The beam of IR light traces a path on the retina of the user 102. Because retinal blood vessels absorb more of the IR light than the rest of the eye, the amount of reflection varies during the retinal scan. The pattern of variations may be used as a biometric data unique to the user 102.

In another example embodiment, the internal camera may include an ocular camera configured to capture an image of an iris in the eye of the user 102. In response to the amount of light entering the eye, muscles attached to the iris expand or contract the aperture at the center of the iris, known as the pupil. The expansion and contraction of the pupil depends on the amount of ambient light. The ocular camera may use iris recognition as a method for biometric identification. The complex pattern on the iris of the eye of the user 102 is unique and can be used to identify the user 102. The ocular camera may cast infrared light to acquire images of detailed structures of the iris of the eye of the user 102. Biometric algorithms may be applied to the image of the detailed structures of the iris to identify the user 102.

In another example embodiment, the ocular camera includes an IR pupil dimension sensor that is pointed at an eye of the user 102 to measure the size of the pupil of the user 102. The IR pupil dimension sensor may sample the size of the pupil (e.g., using an IR camera) on a periodic basis or based on predefined triggered events (e.g., user 102 walks into a different room, sudden changes in the ambient light, or the like).

The audio sensor 310 includes a microphone. For example, the microphone may be used to record a voice command from the user 102. In other examples, the microphone may be used to measure ambient noise level to measure the intensity of the background noise. In another example, the microphone may be used to capture ambient noise. Analytics may be applied to the captured ambient noise to identify specific type of noises such as explosions or gunshot noises.

The IMU 304 includes a gyroscope and an inertial motion sensor to determine an orientation and movement of the AR device 104. For example, the IMU 304 measures the velocity, orientation, and gravitational forces on the AR device 104. The IMU 304 also detects a rate of acceleration using an accelerometer and changes in angular rotation using a gyroscope.

The location sensor 312 determines a geolocation of the AR device 104 using a variety of techniques such as near field communication, GPS, Bluetooth, Wi-Fi. For example, the location sensor 312 generates geographic coordinates of the AR device 104.

The barometric sensor 306 measures atmospheric pressure differential to determine an altitude of the AR device 104. For example, the barometric sensor 306 may be used to determine whether the AR device 104 is located on a first floor or a second floor of a building.

The humidity sensor 314 determines a relative humidity level ambient to the AR device 104. For example, the humidity sensor 314 determines the humidity level of a room in which the AR device 104 is located.

The ambient light sensor 308 determines an ambient light intensity around the AR device 104. For example, the ambient light sensor 308 measures the ambient light in a room in which the AR device 104 is located.

The biometric sensor 316 includes sensors configured to measure biometric data unique to the user 102 of the AR device 104. In one example embodiment, the biometric sensors 316 include an ocular camera, an EEG (electroencephalogram) sensor, and an ECG (electrocardiogram) sensor. It is noted that the biometric sensor 316 described herein are for illustration purposes. Biometric sensors 316 are thus not limited to the ones described.

The EEG sensor includes, for example, electrodes that, when in contact with the skin of the head of the user 102, measure electrical activity of the brain of the user 102. The EEG sensor may also measure the electrical activity and wave patterns through different bands of frequency (e.g., Delta, Theta, Alpha, Beta, Gamma, Mu). EEG signals may be used to authenticate a user 102 based on fluctuation patterns unique to the user 102.

The ECG sensor includes, for example, electrodes that measure a heart rate of the user 102. In particular, the ECG may monitor and measure the cardiac rhythm of the user 102. A biometric algorithm is applied to the user 102 to identify and authenticate the user 102. In one example embodiment, the EEG sensor and ECG sensor may be combined into a same set of electrodes to measure both brain electrical activity and heart rate. The set of electrodes may be disposed around the helmet so that the set of electrodes comes into contact with the skin of the user 102 when the user 102 wears the AR device 104.

Referring back to FIG. 2, the display 204 may include a display (e.g., display surface, lens) capable of displaying AR content (e.g., images, video) generated by the processor 210. The display 204 may be transparent so that the user 102 can see through the display 204 (e.g., such as in a head-up display).

The storage device 208 stores a library of AR content. The AR content may be associated with a specific user task. For example, a user task may be assembling a component. The AR content associated with the task may display virtual objects to show how to assemble the component step by step. The AR content may be associated with the user 102 (e.g., a technician level 2 may have access to AR content related to the technician's duties and responsibilities). The AR content may be downloaded from the server 110 based on an authentication of the user 102 with the AR device 104. The AR content may include two or three dimensional models of virtual objects with corresponding audio. In other examples, the AR content may include an AR application that includes interactive features such as displaying additional data (e.g., location of sprinklers) in response to the user input (e.g., user 102 says "show me the locations of the sprinklers" while looking at an AR overlay showing location of the exit doors). AR applications may have their own different functionalities and operations. Therefore, each AR application may operate distinctly from other AR applications.

The processor 210 includes an AR application 202, and a predictive AR assistance module 212. The AR application 202 generates a display of information related to the physical object 112. For example, the AR application 202 generates a visualization of information related to the physical object 112 when the AR device 104 captures an image of the physical object 112 and recognizes the physical object 112 or when the AR device 104 is in proximity to the physical object 112. For example, the AR application 202 generates a display of a holographic or virtual menu visually perceived as a layer on the physical object 112.

For example, the AR application 202 displays instructions or virtual objects demonstrating how to operate the physical object 112. The virtual objects may include three-dimensional objects that appear as a layer on top of the physical object 112. In one example embodiment, the three-dimensional objects may be scaled and positioned on corresponding parts of the physical object 112 so that the three-dimensional objects appear to be part of the physical object 112.

The predictive AR assistance module 212 measures data related to the user (e.g., profile of the user), data related to the AR device 104 (e.g., AR model number, version of AR application), context data related to the user and the AR device 104 (e.g., which features of the AR application are used the most by the user 102, which features of the AR application are mostly likely to be used by the user 102 based on other users having similar profiles, biometric data of the user, ambient environment data of the AR device 104). In one example embodiment, the predictive AR assistance module 212 measures user interactions with the physical object 112 and the user interactions with virtual user interfaces or virtual content generated or rendered by the AR device 104. The predictive AR assistance module 212 collects sensor data and user interactions and determines a context of the AR application based on the sensor data and user interactions (e.g., is the user located in a humid room? Is the user a technician under stress? Does the user typically uses diagnostics tool before touching the physical object 112?). The predictive AR assistance module 212 then generates a behavior analysis based on the context (e.g., user typically uses commands a, b, and c in the morning, user has an upcoming important meeting, patterns of user interactions with the AR application and tasks of the user).

Any one or more of the modules described herein may be implemented using hardware (e.g., a processor 210 of the AR device 104) or a combination of hardware and software. For example, any module described herein may configure a processor 210 to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 4:
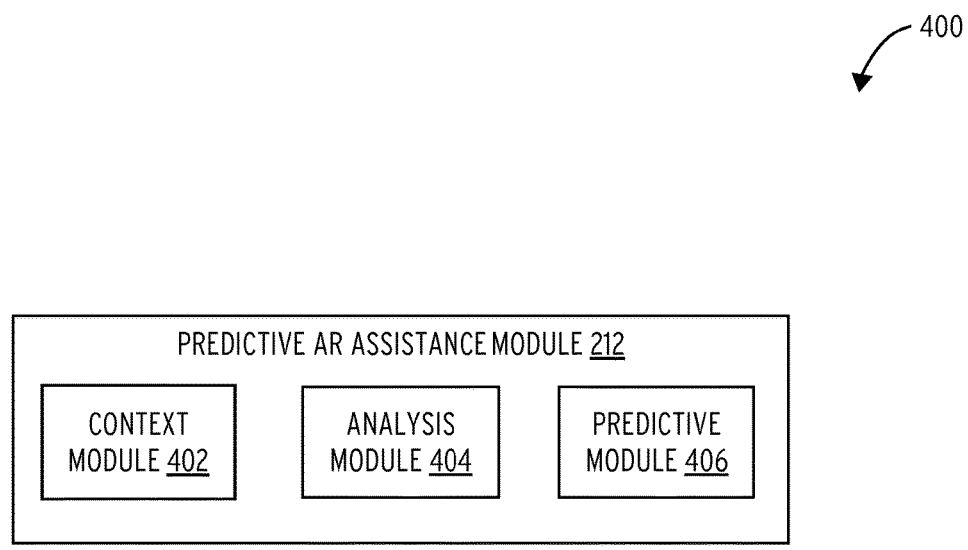
FIG. 4 is a block diagram illustrating an example embodiment of modules of a predictive AR assistance module.

FIG. 4 is a block diagram illustrating an example embodiment of the predictive AR assistance module 212. The predictive AR assistance module 212 may generate or customize AR content based on a combination of a predicted model of a user based on behavioral analysis of the user.

The predictive AR assistance module 212 is shown, by way of example, to include a context module 402, an analysis module 404, and a predictive module 406. The context module 402 determines a context in which the user 102 is operating the AR device 104. For example, the context may include user-based context, ambient-based context, and application-based context. The user-based context is based on user-based sensor data related to the user 102. For example, the user-based context may be based on a comparison of user-based sensor data with user-based sensor data ranges defined in a library in the storage device 208 or in the server 108. For example, the user-based context may identify that the user 102's heart rate is exceedingly high based on a comparison of the user 102's heart rate with a reference heart rate range for the user 102. The ambient-based context is based on a comparison of ambient-based sensor data with ambient-based sensor data ranges defined in a library in the storage device 208 or in the server 108. For example, the ambient-based context may identify that the machine in front of the AR device 104 is exceedingly hot based on a comparison of the machine's temperature with a reference temperature for the machine. The application-based context is based on a comparison of application-based sensor data with application-based sensor data ranges defined in a library in the storage device 208 or in the server 108. For example, the application-based context may identify a task performed by the user 102 (e.g., the user 102 is performing a maintenance operation on a machine) based on the location of the AR device 104, the time and date of the operation, the user 102's identification, the status of the machine (e.g., physical object 112).

The analysis module 404 performs an analysis on the data from the context module 402 to determine trends, patterns, and information that can be used to predict user behavior and customized AR content. For example, the analysis may user statistical tools to determine patterns and correlation between elements from the context data.

The predictive module 406 generates a predictive model based on the analysis of the analysis module 404. Examples of predictive model may include deep learning, artificial intelligence, among other models.

Figure 5:
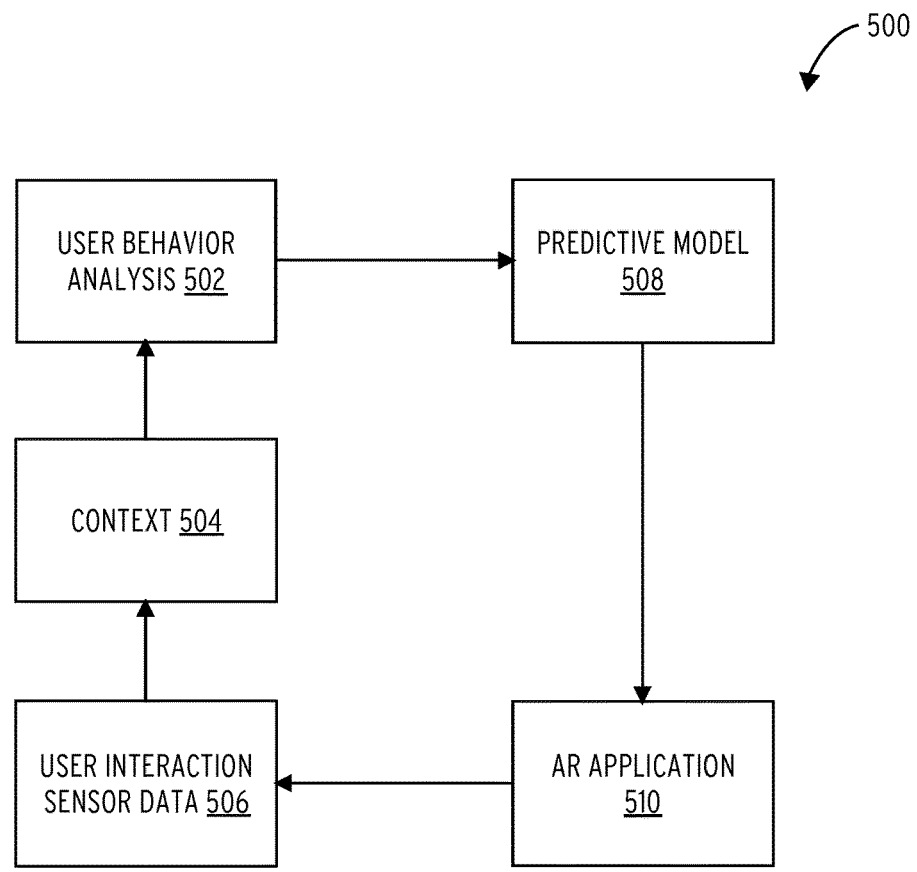
FIG. 5 is a block diagram illustrating an example embodiment of an operation of the predictive AR assistance module with the AR application.

FIG. 5 is a block diagram illustrating an example embodiment of an operation of the predictive AR assistance module with the AR application. At block 510, an AR application generates and displays AR content in an AR display device. The user interactions with the AR content and sensor data from the AR display device are recorded in block 506. For example, the user interactions data includes a frequency of how often a user uses a component or a feature of the AR application (e.g., views specific elements of the AR content). The sensor data includes for example, a heart rate of the user, ambient temperature, an image of a physical object captured with a camera of the AR device. Other types of data may be recorded at block 506. For example, data identifying which websites or AR application component (e.g., fixing tutorial module) the user operates the most during a specific task (e.g., fix AC unit) or during specific periods of time (e.g., weekdays) or location (e.g., within a building). Other data may include social network data that identifies personal preferences from a social network provider server, email data, contact data, calendar data from an email server. Those of ordinary skills in the art will recognize that other types of data that further provide information about the user can be used and accessed in block 506.

At block 504, the context is generated based on the user interactions and the sensor data. For example, the context identifies that the user is a rookie technician that typically uses physical tools x, y, z to fix an engine and accesses virtual content a, b, and c to fix the engine.

At block 502, the user behavior analysis analyzes the context to generate a predictive model at block 508. For example, the model for the rookie technician user is that physical tools x, y, z are needed to fix the engine and virtual content a, b, and c are used to provide guidance on how to fix the engine.

At block 508, the predictive model directs the AR application to identify a location of the physical tools x, y, z when the rookie technician starts a repair task on enters the hangar at a predicted time. The predictive model may also direct the AR application to pre-load the virtual content a, b, and c in the AR application when the rookie user enters the hanger.

Figure 6:
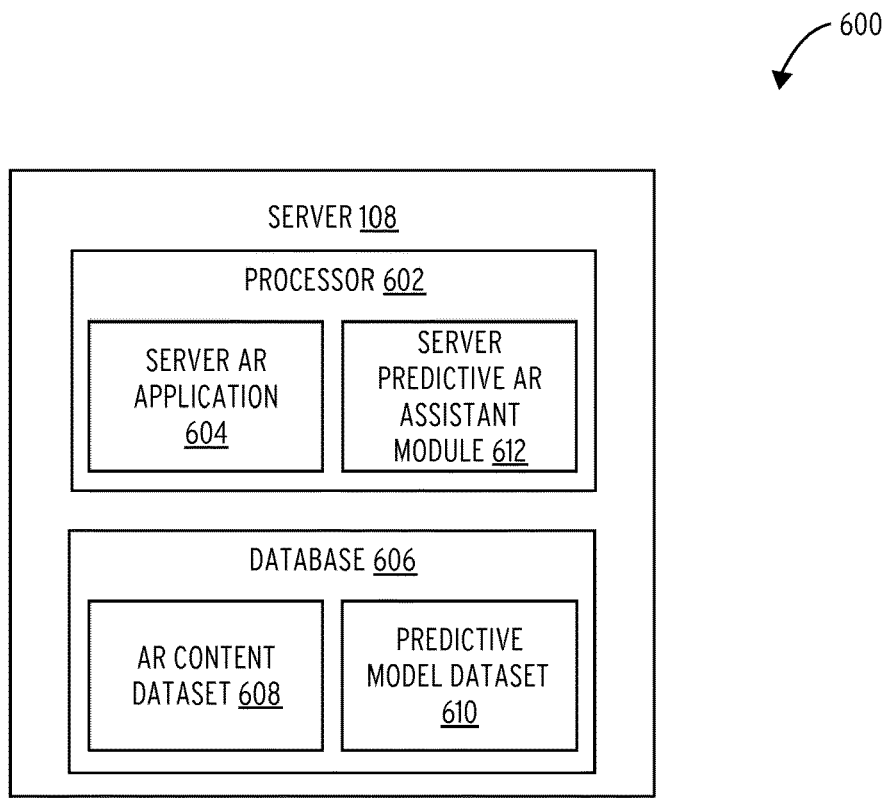
FIG. 6 is a block diagram illustrating an example embodiment of a server.

FIG. 6 is a block diagram illustrating modules (e.g., components) of the server 108. The server 108 includes a processor 602, and a database 606. The server 108 communicates with the AR device 104.

The processor 602 includes a server AR application 604. The server AR application 604 identifies real world physical object 112 based on a picture or image frame received from the AR device 104. In another example, the AR device 104 has already identified physical object 112 and provides the identification information to the server AR application 604. In another example embodiment, the server AR application 604 determines the physical characteristics associated with the real world physical object 112. For example, if the real world physical object 112 is a gauge, the physical characteristics may include functions associated with the gauge, location of the gauge, reading of the gauge, other devices connected to the gauge, safety thresholds or parameters for the gauge. AR content may be generated based on the real world physical object 112 identified and a status of the real world physical object 112.

The server predictive AR assistance module 612 generates custom AR content to the user of an AR device based on a predictive model. The server predictive AR assistance module 612 operates in a similar manner as the predictive AR assistance module 212 of the AR device 104.

The database 510 may store an AR content dataset 608 and a predictive model dataset 610. The AR content dataset 608 may include a set of images or identifiers and corresponding virtual object models. The predictive model dataset includes a predictive model for different users of the AR device.

Figure 7:
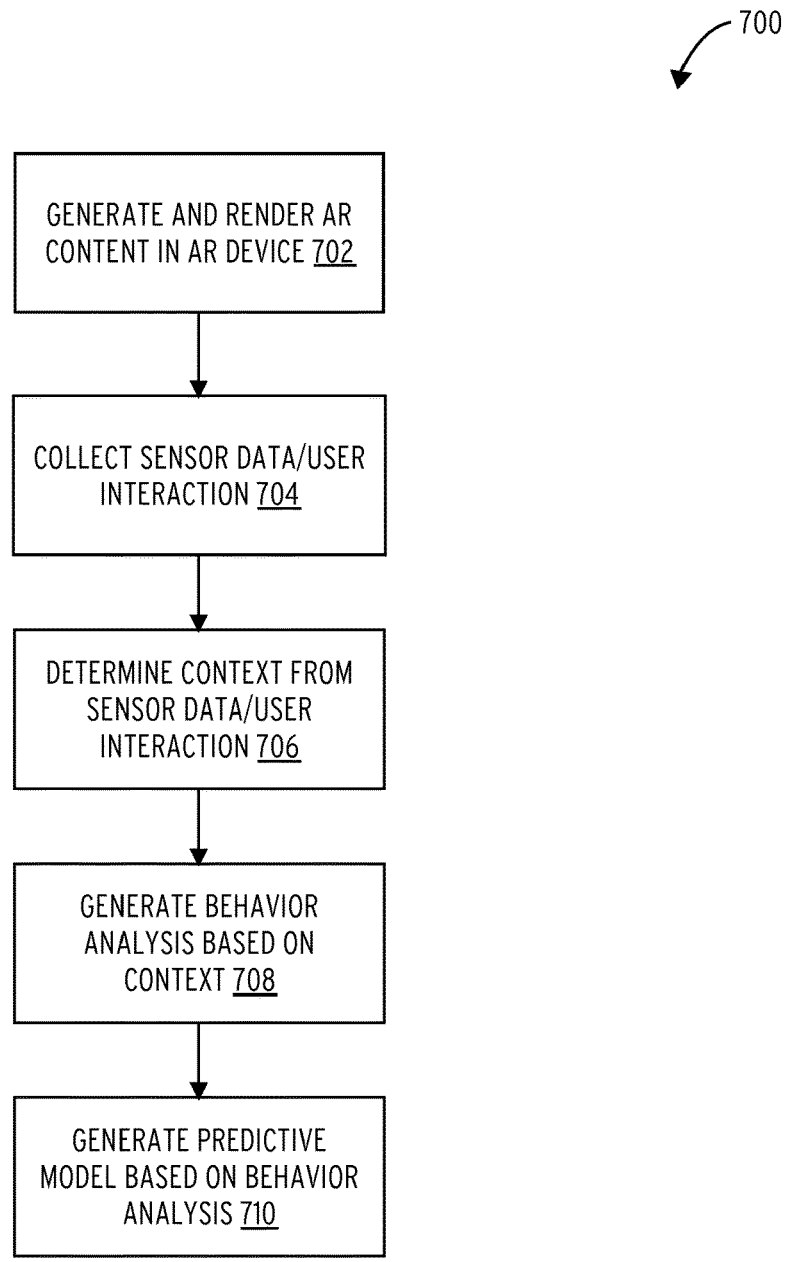
FIG. 7 is a flowchart illustrating an example operation of a predictive AR assistance module.

FIG. 7 is a flowchart illustrating an example operation of a predictive AR assistance module. At operation 702, an AR device generates and displays AR content. In one example embodiment, operation 702 may be implemented using the AR application 202 of the AR device 104.

At operation 704, sensor data and user interactions with the AR content are recorded. In one example embodiment, operation 704 may be implemented using the context module 402 of the predictive AR assistance module 212 of the AR device 104.

At operation 706, a context is determined from the sensor data and user interactions. In one example embodiment, operation 706 may be implemented using the context module 402 of the predictive AR assistance module 212 of the AR device 104.

At operation 708, a user behavioral analysis is performed based on the context previously determined at operation 706. In one example embodiment, operation 708 may be implemented using the behavior analysis module 404 of the predictive AR assistance module 212 of the AR device 104.

At operation 710, a predictive model is generated based on the user behavioral analysis previously determined at operation 708. In one example embodiment, operation 710 may be implemented using the predictive module 406 of the predictive AR assistance module 212 of the AR device 104.

Figure 8:
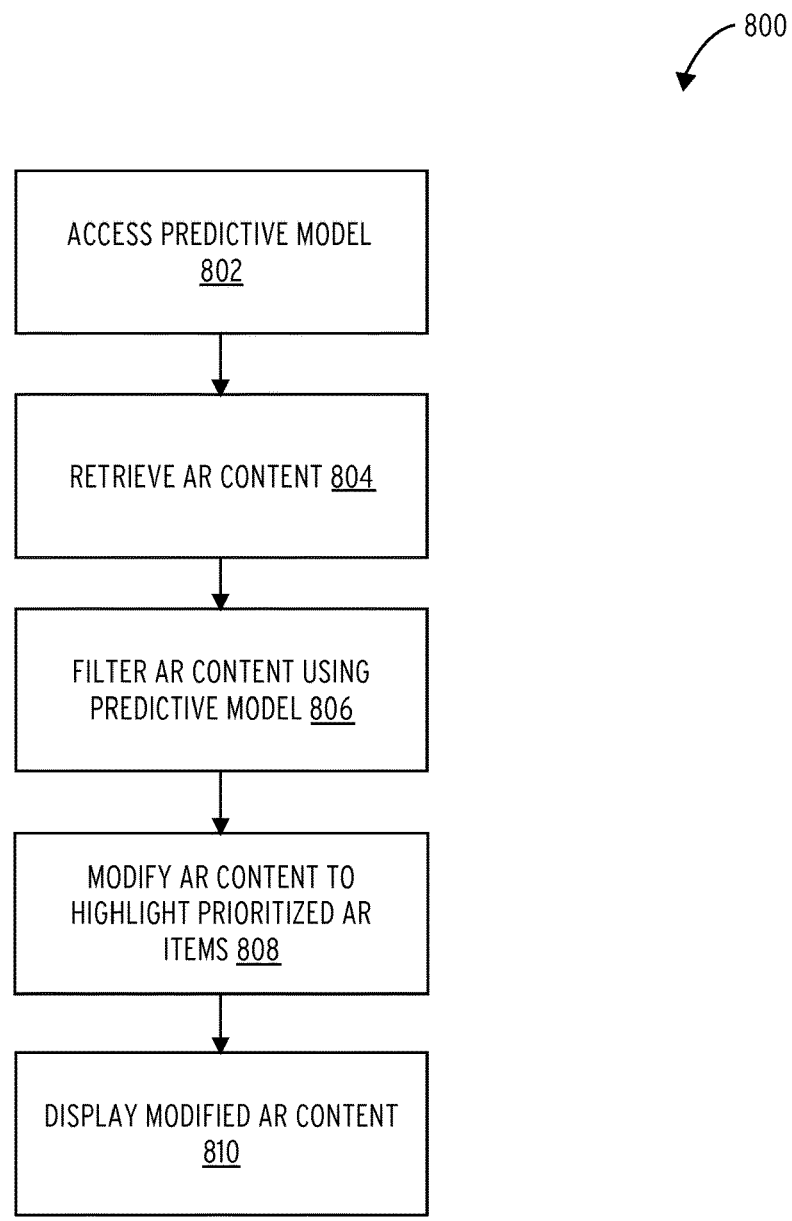
FIG. 8 is a flowchart illustrating another example operation of a predictive AR assistance module.

FIG. 8 is a flowchart illustrating another example operation of a predictive AR assistance module. At operation 802, the AR device 104 accesses a predictive model of the user of the AR device 104. At operation 804, the AR device 104 retrieves an AR content that is, for example, associated with a task for the user. At operation 806, the AR device 104 filters the AR content using a predictive model. At operation 808, the AR device 104 modifies the AR content to highlight and prioritize certain AR items that are determined to be most relevant to the user or the task of the user based on the predictive model. At operation 810, the AR device 104 displays the modified AR content.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor 210 or a group of processors 210) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor 210 or other programmable processor 210) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 210 configured using software, the general-purpose processor 210 may be configured as respective different hardware modules at different times. Software may accordingly configure a processor 210, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors 210 that are temporarily configured (e.g., by software) or permanently configured to perform the relevant operations. Whether temporarily or permanently configured, such processors 210 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 210 or processor-implemented modules. The performance of certain of the operations may be distributed among the one or more processors 210, not only residing within a single machine, but deployed across a number of machines. In some example embodiments, the processor or processors 210 may be located in a single location (e.g., within a home environment, an office environment or as a server farm), while in other embodiments the processors 210 may be distributed across a number of locations.

The one or more processors 210 may also operate to support performance of the relevant operations in a "cloud computing" environment or as a "software as a service" (SaaS). For example, at least some of the operations may be performed by a group of computers (as examples of machines including processors 210), these operations being accessible via a network 108 and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor 210, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network 108.

In example embodiments, operations may be performed by one or more programmable processors 210 executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers 110. A client and server 110 are generally remote from each other and typically interact through a communication network 108. The relationship of client and server 110 arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor 210), or a combination of permanently and temporarily configured hardware may be a design choice. Below are set out hardware (e.g., machine) and software architectures that may be deployed, in various example embodiments.

Example Machine Architecture

Figure 9:
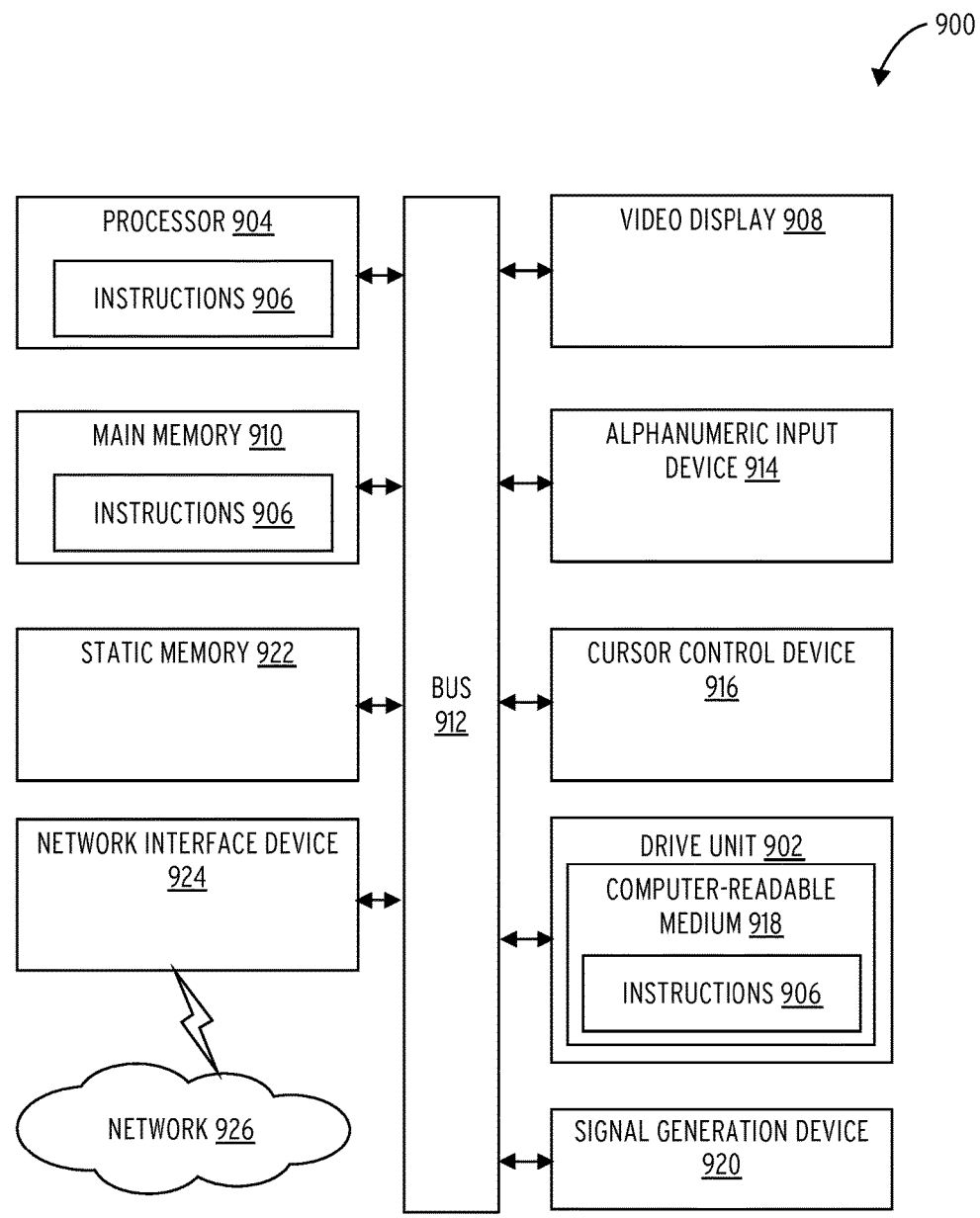
FIG. 9 is a block diagram illustrating components of a machine, according to some example embodiments, able to read instructions from a machine-readable medium and perform any one or more of the methodologies discussed herein.

FIG. 9 is a block diagram of a machine in the example form of a computer system 900 within which instructions 906 for causing the machine to perform any one or more of the methodologies discussed herein may be executed. In alternative embodiments, the machine operates as a stand-alone device or may be connected (e.g., networked) to other machines. In a networked deployment, the machine may operate in the capacity of a server 110 or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions 906 (sequential or otherwise) that specify actions to be taken by that machine. Further, while only a single machine is illustrated, the term "machine" shall also be taken to include any collection of machines that individually or jointly execute a set (or multiple sets) of instructions 924 to perform any one or more of the methodologies discussed herein.

The example computer system 900 includes a processor 904 (e.g., a central processing unit (CPU), a graphics processing unit (GPU) or both), a main memory 910 and a static memory 922, which communicate with each other via a bus 912. The computer system 900 may further include a video display unit 908 (e.g., a liquid crystal display (LCD) or a cathode ray tube (CRT)). The computer system 900 also includes an alphanumeric input device 914 (e.g., a keyboard), a user interface (UI) navigation (or cursor control) device 916 (e.g., a mouse), a disk drive unit 902, a signal generation device 920 (e.g., a speaker) and a network interface device 924.

Machine-Readable Medium

The drive unit 902 includes a machine-readable medium 918 on which is stored one or more sets of data structures and instructions 906 (e.g., software) embodying or utilized by any one or more of the methodologies or functions described herein. The instructions 906 may also reside, completely or at least partially, within the main memory 910 and/or within the processor 904 during execution thereof by the computer system 900, the main memory 910 and the processor 904 also constituting computer-readable media 918. The instructions 906 may also reside, completely or at least partially, within the static memory 922.

While the computer-readable medium 918 is shown, in an example embodiment, to be a single medium, the term "machine-readable medium" and "computer-readable medium" may include a single medium or multiple media (e.g., a centralized or distributed database, and/or associated caches and servers 108) that store the one or more instructions 906 or data structures. The term "machine-readable medium" shall also be taken to include any tangible medium that is capable of storing, encoding or carrying instructions 906 for execution by the machine and that cause the machine to perform any one or more of the methodologies of the present embodiments, or that is capable of storing, encoding or carrying data structures utilized by or associated with such instructions 906. The term "machine-readable medium" shall accordingly be taken to include, but not be limited to, solid-state memories, and optical and magnetic media. Specific examples of computer-readable media 918 include non-volatile memory, including by way of example semiconductor memory devices (e.g., erasable programmable read-only memory (EPROM), electrically erasable programmable read-only memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

Transmission Medium

The instructions 906 may further be transmitted or received over a communications network 926 using a transmission medium. The instructions 906 may be transmitted using the network interface device 926 and any one of a number of well-known transfer protocols (e.g., HTTP). Examples of communication networks 926 include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions 906 for execution by the machine, and includes digital or analog communications signals or other intangible media to facilitate communication of such software.

Although an embodiment has been described with reference to specific example embodiments, it will be evident that various modifications and changes may be made to these embodiments without departing from the scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The following enumerated embodiments describe various example embodiments of methods, machine-readable media, and systems (e.g., machines, devices, or other apparatus) discussed herein.

A first embodiment provides a device comprising:
a display;
one or more hardware processors; and
a memory storing instructions that, when executed by the one or more hardware processors, configure the device to perform operations comprising:
  generating and rendering an augmented reality (AR) content in the display of the device;
  tracking user interactions with the AR content of a user of the device;
  determining a context of the user interactions with the AR content based on the user interactions;
  generating a behavioral analysis of a user of the device based on the context of the user interaction;
  generating a predictive model of the user of the device based on the behavioral analysis; and
  modifying the AR content based on the predictive model of the user of the device.

A second embodiment provides a device according to the first embodiment, further comprising:
  a sensor,
  wherein the operations further comprises:
  detecting and identifying a physical object with the sensor;
  generating the AR content in the display as an overlay of the physical object, the AR content including a three-dimensional model of a virtual object associated with the identified physical object; and
  adjusting a display of the AR content based on a relative position between the device and the physical object.

A third embodiment provides a device according to the second embodiment, wherein the context includes a user-based context, an ambient-based context, and an AR application-based context.

A fourth embodiment provides a device according to the third embodiment, wherein the user-based context includes a profile of the user and biometrics data of the user.

A fifth embodiment provides a device according to the third embodiment, wherein the ambient-based context includes an identification of a task of the user of the device, ambient data from sensors detecting an ambient environment of the device, and an identification of a location and a position of the device.

A sixth embodiment provides a device according to the third embodiment, wherein the AR application-based context includes an identification of a feature of an AR application in the device, the feature being utilized by the user of the device.

A seventh embodiment provides a device according to the second embodiment, wherein the behavioral analysis of the user includes an analysis of interactions between the user of the device and items of the AR content.

An eighth embodiment provides a device according to the second embodiment, wherein modifying the AR content includes:
  filtering the AR content to remove items having the least amount of user interactions from the user of the device;
  removing redundant items in the AR content; and
  removing items in the AR content with the least relevance to a task being performed by the user of the device.

A ninth embodiment provides a device according to the first embodiment, wherein modifying the AR content includes:
  generating a suggested AR item based on the predictive model of the user.

A tenth embodiment provides a device according to the first embodiment, wherein the operations further comprises:
  generating and rendering the modified AR content in the display of the device; and
  recursively modifying the AR content based on a profile of the user and the user interactions with items of the modified AR content.

What is claimed is:

1. A device comprising:
  a display;
  one or more hardware processors; and
  a memory storing instructions that, when executed by the one or more hardware processors, configure the device to perform operations comprising:
    generating and displaying augmented reality (AR) content in the display of the device;
    tracking user interactions by a user of the device with the AR content;
    determining a context of the user interactions with the AR content based on the user interactions;
    generating a behavioral analysis of the user of the device based on the context of the user interactions, the behavioral analysis of the user being generated based on the context that is determined based on the tracking user interactions by the user with the AR content;
    generating a predictive model of the user of the device based on the behavioral analysis;
    modifying the AR content based on the predictive model of the user of the device; and
    filtering the AR content by removing one or more items having the least amount of user interactions from the user of the device, removing redundant items in the AR content, and removing one or more items in the AR content with the least relevance to a task being performed by the user of the device.

2. The device of claim 1, further comprising:
  a sensor,
  wherein the operations further comprise:
    detecting and identifying a physical object using the sensor;
    generating the AR content in the display as an overlay of the physical object, the AR content including a three-dimensional model of a virtual object associated with the identified physical object; and
    adjusting a display of the AR content based on a relative position between the device and the physical object.

3. The device of claim 2, wherein the context includes a user-based context, an ambient-based context, and an AR application-based context.

4. The device of claim 3, wherein the user-based context includes a profile of the user and biometrics data of the user.

5. The device of claim 3, wherein the ambient-based context includes an identification of a task of the user of the device, ambient data from sensors detecting an ambient environment of the device, and an identification of a location and a position of the device.

6. The device of claim 3, wherein the AR application-based context includes an identification of a feature of an AR application in the device, the feature being utilized by the user of the device.

7. The device of claim 1, wherein modifying the AR content includes:
generating a suggested AR item based on the predictive model of the user.

8. The device of claim 1, wherein the operations further comprises:
generating and rendering the modified AR content in the display of the device; and
recursively modifying the AR content based on a profile of the user and the user interactions with items of the modified AR content.

9. A method comprising:
generating and rendering an augmented reality (AR) content in a display of a device;
tracking user interactions with the AR content of a user of the device;
determining a context of the user interactions with the AR content based on the user interactions;
generating a behavioral analysis of the user of the device based on the context of the user interactions, the behavioral analysis of the user being generated based on the context that is determined based on the tracking user interactions by the user with the AR content;
generating a predictive model of the user of the device based on the behavioral analysis;
modifying the AR content based on the predictive model of the user of the device; and
filtering the AR content by removing one or more items having the least amount of user interactions from the user of the device, removing redundant items in the AR content, and removing one or more items in the AR content with the least relevance to a task being performed by the user of the device.

10. The method of claim 9, further comprising:
detecting and identifying a physical object using a sensor of the device;
generating the AR content in the display as an overlay of the physical object, the AR content including a three-dimensional model of a virtual object associated with the identified physical object; and
adjusting a display of the AR content based on a relative position between the device and the physical object.

11. The method of claim 10, wherein the context includes a user-based context, an ambient-based context, and an AR application-based context.

12. The method of claim 11, wherein the user-based context includes a profile of the user and biometrics data of the user.

13. The method of claim 11, wherein the ambient-based context includes an identification of a task of the user of the device, ambient data from sensors detecting an ambient environment of the device, and an identification of a location and a position of the device.

14. The method of claim 11, wherein the AR application-based context includes an identification of a feature of an AR application in the device, the feature being utilized by the user of the device.

15. The method of claim 9, wherein modifying the AR content includes:
generating a suggested AR item based on the predictive model of the user.

16. A non-transitory machine-readable medium comprising instructions that, when executed by one or more processors of a machine, cause the machine to perform operations comprising:
generating and displaying augmented reality (AR) content in the display of the device;
tracking user interactions by a user of the device with the AR content;
determining a context of the user interactions with the AR content based on the user interactions;
generating a behavioral analysis of the user of the device based on the context of the user interactions, the behavioral analysis of the user being generated based on the context that is determined based on the tracking user interactions by the user with the AR content;
generating a predictive model of the user of the device based on the behavioral analysis;
modifying the AR content based on the predictive model of the user of the device; and
filtering the AR content by removing one or more items having the least amount of user interactions from the user of the device, removing redundant items in the AR content, and removing one or more items in the AR content with the least relevance to a task being performed by the user of the device.

* * * * *